Sept. 19, 1944.  J. FROVA  2,358,501
JACK OR ELEVATOR DEVICE FOR VEHICLES
Filed March 9, 1944
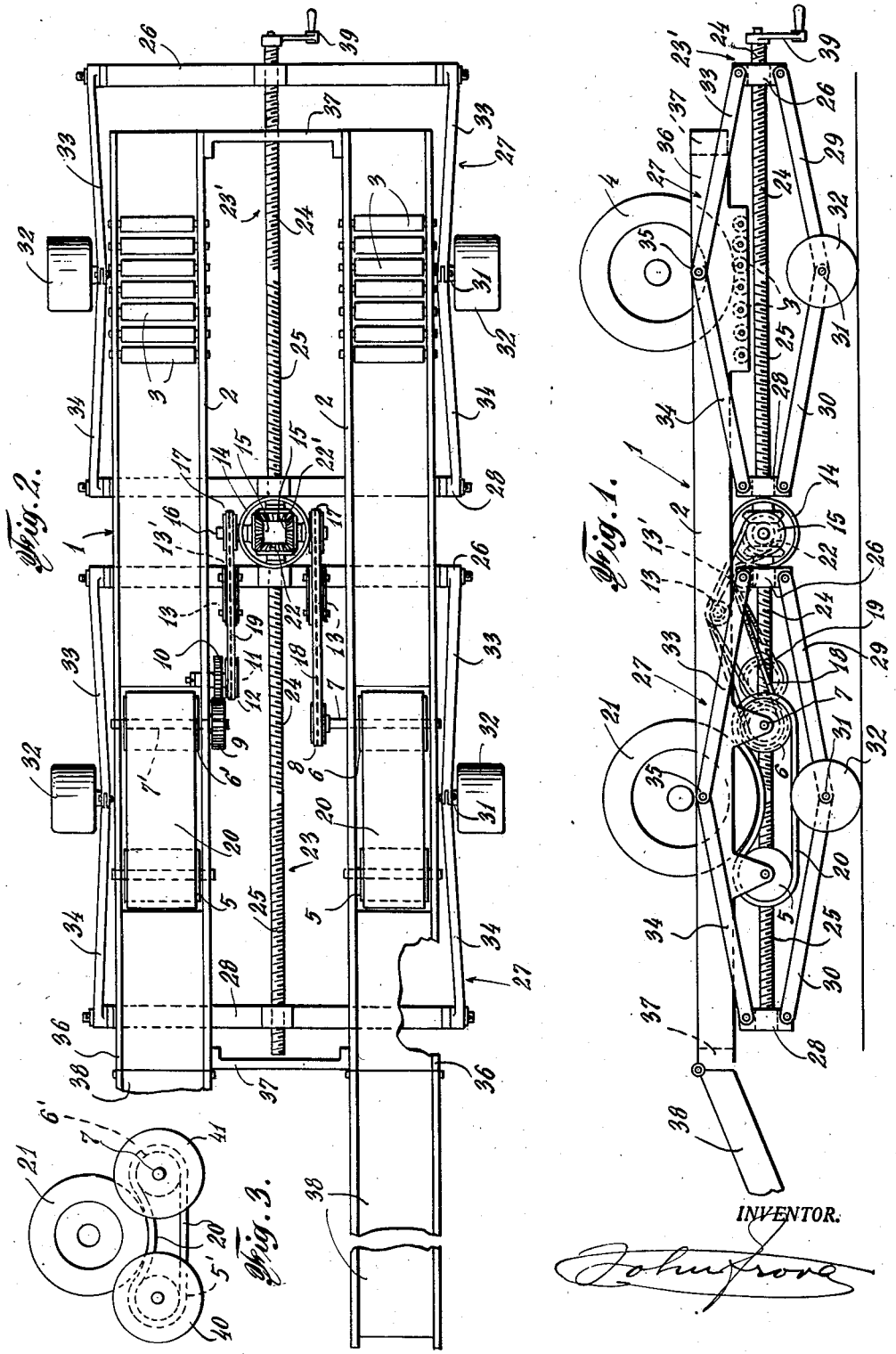
INVENTOR.

Patented Sept. 19, 1944

2,358,501

UNITED STATES PATENT OFFICE 2,358,501

JACK OR ELEVATOR DEVICE FOR VEHICLES

John Frova, Jackson Heights, N. Y.

Application March 9, 1944, Serial No. 525,690

6 Claims. (Cl. 254—89)

The present invention relates to jacks and elevator devices of the power operated and transportable type for automobiles and self propelled vehicles equipped to allow the latter to be run up on the same and the vehicle then raised as desired.

The main object of my invention is to provide a transportable and power operated jack or elevator device for cars which can carry a car in any required raised position, and can itself be transported to any location for use.

Another object is to have such a device equipped with special means for raising the car upon the jack or elevator structure by the use of the power of the car on the same.

Other objects and the various advantages of the invention will appear more fully in detail as this specification proceeds, especially when taken together with the accompanying drawing forming part hereof, and in which Fig. 1 is a longitudinal section of a jack structure or elevator device made according to the principles of the invention and showing the wheels of a vehicle in position on the apparatus;

Fig. 2 is a top plan view of the same apparatus of Fig. 1 with folding runners at one end extended to allow a car to be run up on the structure;

Fig. 3 is a side elevation of a modification of the power drive shown in Fig. 1.

Throughout the views the same numerals indicate the same or like parts.

When repairing, cleaning or greasing cars and therefore desiring to have access to the underside of the cars, it is usual to run the latter up on raised channels or over greasing pits, etc., but such facilities are fixed, have certain disadvantages, are also limited in several ways and may even be rather dangerous to workmen. The main disadvantages are that often it is necessary to raise a car out on the road or some distance from the home garage or repair shop, and that only one corner or one end of the car can be raised by the jacks which may be available. The invention herein makes it possible to transport a special jack or elevator structure to the car wherever located and then raise the car completely off the ground by a power drive operated from the car itself.

Hence, in the practice of my invention, a jack or elevator structure, generally indicated at 1 includes a pair of substantially parallel channel members 2, 2 which are supported and raised and lowered in a manner and by special means to be presently explained. Upon the channel members and near their forward ends are mounted a group of freely rotatable idler rollers 3, 3 which are adapted to support the front wheels 4 of an automobile, army "Jeep" or other self propelled vehicle, the rollers allowing the front wheels to rotate without displacing the vehicle along the channel members.

Upon each channel member, a distance to the rear of the idler rollers 3, 3 are a pair of spaced rollers or pulleys 5, 6 which are larger than the idler rollers, the rear pulley in each pair being freely mounted for rotation. The forward pulley of one pair is secured upon a drive shaft 7 and the other forward pulley on the other channel member at 6' is secured to a similar drive shaft 7', shaft 7 being provided on its inner end with a chain sprocket 8, while the other shaft 7' has a spur gear 9 on its inner end meshing with another spur gear 10 fixed on one end of a short shaft 11 which carries on its other end a chain sprocket 12 similar to sprocket 8 on shaft 7. Between the channel members is located a gear casing 14 containing a pair of bevel gears 15, 15 secured upon two aligned shafts 16, 16 extending out through the sides of said casing and exteriorly thereof carrying chain sprockets 17, 17 connected to previously mentioned sprockets 8 and 12 by means of chains 18, 19, respectively.

Each pair of pulleys on the channel members has a belt or chain, etc., 20 of the endless type connecting said pulleys and having a slack between the latter of sufficient length to provide a substantial wrap of the car wheel 21 at the rear and allow the latter to rest on the belt or chain and the pulleys at the same time, so as to have enough traction with the belt to drive the same and the pulleys when the rear wheels are rotated by the power drive of the car, as shown in Fig. 1. If the power is thus applied and the belts or chains 20 driven as mentioned, the gears and sprockets will be driven by the pulleys, the sprocket 8 driving sprocket 17 on its own side in the same direction as the pulleys 5, 6 through chain 18, including also the bevel gear 15 on the right side in casing 14. The pulley 6' will likewise drive shaft 7' in the same direction together with gear 9, but the latter by meshing with gear 10 will drive the same in the opposite direction together with sprocket 12 and through chain 19 also sprocket 17 on the same side in said opposite direction. As both bevel gears 15, 15 mesh with a pair of further bevel gears 22 in casing 14, the forward gear 22' will be rotated counterclockwise and the rearward gear 22 clockwise.

Longitudinally of the apparatus is a pair of aligned feed screw shafts 23, 23' secured at their inner ends to the two bevel gears 22, 22' last mentioned, the shafts each having two opposite screw threads 24, 25. The threads of the forward portions 24 pass through and engage in two cross bars or pieces 26, 26, on the rear one of the latter being mounted a pair of idler sprockets or rollers 13, 13' for the chain 18 on one side and a similar pair for chain 19 on the other side to allow the drive chains to be bent over cross bar 26 and to permit the channel members to be raised and lowered while retaining the same relation with respect to the sprockets 8, 12 and 17, 17 in all positions of said channel members.

However, the mentioned cross pieces or bars 26, 26 refer to a toggle structure generally indicated at 27 beneath the forward portion of the channel members and to a similar toggle structure 27 beneath the rear portion of the same channel members, the opposite portions of said toggle structures being provided with similar cross members 28, 28. The mentioned toggle structures have lower links 29, 30 pivotally connected together upon transverse shafts 31, 31 which are provided upon their outer ends with traction rollers 32, 32 for transportably carrying the entire apparatus so that it may be rolled from one location to another. The other ends of links 29, 30 are pivotally connected to the ends of cross bars 26, 28 in each toggle structure, while to said ends of the same cross pieces are also pivotally connected upper links 33 and 34, the upper and lower links in each case being duplicated on both sides of the apparatus. The upper links are connected together upon pins or stub shafts 35, 35 which penetrate the sides 36, 36 upon the exterior edges of the channel members and thereby support the latter upon said toggle structures.

In order to maintain the channel members parallel and acting together as a unit, they are secured to each other by cross pieces 37, 37 or in any other manner to virtually form a frame. To facilitate running cars up on these channel members, the latter are provided at their rear ends with folding runners 38, 38 hinged thereto.

While the pulleys 5, 6, etc., have been shown in Figs. 1 and 2 in one form, they may also be provided with flanges 40 and 41 at 5', 6' as shown in Fig. 3 for guiding the wheels of the car so as to center the same and incidentally also retain the belts on said pulleys.

On the other hand, it may be necessary to adjust or in some way alter the positions of the feed shafts 23, 23', and this should be manually performed when no car is on the jack structure. Hence, a hand crank 39 is secured on feed shaft 23, allowing said shaft to be rotated.

From the foregoing it will be evident that if a car is run up on the runners onto the channel members and the wheels of the car allowed to come to rest in the position shown by the wheels in Fig. 1, with the front wheels in place on the idler rollers 3, 3 and the rear wheels on the belts or chains 20, 20, driving the belts forward by means of the rear wheels of the car will cause the feed shafts to rotate clockwise in the case of shaft 23 and counterclockwise in the case of shaft 23'. This will cause the screw threads 24, 25 on each feed shaft to draw the cross pieces 26, 28 in each toggle structure toward each other and thereby raise the structure in each case and with it the channel members. Reversing the rotation of drive wheels 21 of the car will separate the crosspieces 26, 28 and lower the toggle structures and thereby lower the car.

While I have described toggle structures as the elevator means in the present jack structure, operated by a power belt or chain drive originally obtaining the power from the wheels of a car upon the channel members, any other elevator means known to the art may be employed, if desired. Other modifications may be resorted to within the scope of the appended claims, the term belt including chains as well.

Having now fully described my invention, I claim:

1. A jack or elevator apparatus for raising an entire vehicle, including a pair of channel members for supporting the car and guiding the same into position, idler rollers upon both channel members for supporting the front wheels of the car, a pair of spaced pulleys mounted upon each channel member a distance from the idler rollers and having an endless belt about the same for supporting a rear drive wheel of the car upon the spaced pulleys with a depressed portion of the belt between them partly wrapping said rear drive wheel, an extending shaft secured to one pulley upon each channel member having drive means thereon, elevator means supporting said channel members and capable of raising or lowering the same when operated, and means transmitting the motion of said drive means of the extended shaft on each channel member to said elevator means for operating the same to raise or lower said channel members with their rollers and pulleys.

2. A jack or elevator apparatus according to claim 1, wherein the elevator means includes a double toggle structure beneath each end of the apparatus, each double toggle structure supporting both channel members simultaneously.

3. A jack or elevator apparatus for raising an entire vehicle, including a pair of channel members for supporting the car and guiding the same into position, idler rollers upon both channel members for supporting the front wheels of the car, a pair of spaced pulleys mounted upon each channel member a distance from the idler rollers and having an endless belt about the pulleys for receiving the drive of the rear drive wheel of the car supported upon said pulleys, an extending shaft secured to one pulley upon each channel member having drive means thereon, elevator means supporting said channel members and capable of raising or lowering the latter when operated, said elevator means including a plurality of cross pieces having toggle links connected to the ends thereof and portions of said toggle links connected to the channel members to support the same, feed screws engaging with said cross pieces to cause the same to recede from or approach each other in each pair thereof, and means for transmitting the motion of the drive means of the extended shaft on each channel member to said feed screws in order to rotate the latter and thereby raise or lower the channel members, according to the direction of rotation imparted to the feed screws.

4. A jack or elevator apparatus according to claim 1, wherein the channel members form a unit or frame, and the elevator means includes two elevator structures including toggle means beneath said frame having feed screw-means simultaneously operated from the drive means associated with the extending shafts of the pulleys, each elevator structure supporting both channels.

5. A jack or elevator apparatus according to claim 1, wherein the elevator means includes toggle structures which at their lowest portions are provided with traction rollers for transportably supporting the entire apparatus and render the same transportable from one location to another, at will.

6. A jack or elevator apparatus according to claim 1, wherein the elevator means includes toggle structures having rollers beneath the same for rendering the apparatus transportable from one locality to another, and feed screw means for actuating said toggle structures which are power operated by means of the rear wheels of a car placed on said apparatus.

JOHN FROVA.